United States Patent [19]
Barényi

[11] 3,908,478
[45] Sept. 30, 1975

[54] STEERING ARRANGEMENT FOR MOTOR VEHICLES

[75] Inventor: Béla Barényi, Maichingen, Germany

[73] Assignee: Daimler-Benz Aktiengesellschaft, Germany

[22] Filed: Mar. 23, 1973

[21] Appl. No.: 344,100

[30] Foreign Application Priority Data
Mar. 24, 1972 Germany............................ 2214417

[52] U.S. Cl. ................................................ 74/492
[51] Int. Cl.² .......................................... B62D 1/18
[58] Field of Search............ 74/492, 493; 280/150 B

[56] References Cited
UNITED STATES PATENTS

| | | | |
|---|---|---|---|
| 784,042 | 3/1905 | Fowler................................... | 74/493 |
| 3,028,766 | 4/1962 | Musilli................................... | 74/492 |
| 3,176,537 | 4/1965 | Zeigler................................... | 74/492 |
| 3,269,210 | 8/1966 | Steele, Jr. et al...................... | 74/492 |
| 3,468,183 | 9/1969 | Shwartzberg......................... | 74/492 |
| 3,507,165 | 4/1970 | Wilfert et al.......................... | 74/492 |
| 3,659,476 | 5/1972 | Wilfert.................................. | 74/492 |

*Primary Examiner*—Allan D. Herrmann
*Attorney, Agent, or Firm*—Craig & Antonelli

[57] ABSTRACT

A steering arrangement for motor vehicles, especially for passenger motor vehicles, with a steering spindle preferably subdivided by a non-guided deformation element or by joints and supported within the area of the instrument panel, the steering spindle is thereby connected with a steering wheel by way of a deformation member whose axis has a lesser inclination in the zero position of the steering system than the adjoining portion of the steering spindle.

12 Claims, 6 Drawing Figures

STEERING ARRANGEMENT FOR MOTOR VEHICLES

The present invention relates to a steering arrangement for motor vehicles, especially for passenger motor vehicles, with a steering spindle preferably subdivided by means of a non-guided deformation element or by joints and supported within the area of the instrument panel, which steering spindle is connected with a steering wheel by way of a deformation member.

The prior art steering arrangements have altogether the disadvantage that they offer during an accident in principle only a slight protection against injuries on the part of the driver whereas, on the other, they offer this protection only when the deformations caused by the accident are limited to the area in front of the front axle. The steering arrangements of the prior art are generally so designed and laid out that the steering column extends approximately at an angle of 25° to the horizontal. The plane of the steering wheel rim therefore deviates from the vertical by a corresponding angle so that only an edge of the steering wheel rim is disposed opposite the driver. The deformation member between the steering wheel and the steering spindle is so arranged that its axis in which it is constructed relatively deformation-soft, lies in the extension of the steering spindle. It results therefrom that in addition to the disadvantage that a relatively sharp edge of the steering wheel rim is disposed facing the driver, the further disadvantage arises that the deformation-soft axis of the deformation element deviates from the normal impact direction. It may therefore happen that considerable injuries are caused at the chest of a driver by the steering arrangement notwithstanding the presence of a deformation member.

Added thereto is with most steering arrangements in fact that in case of a serious accident, in which also the area of the front axle is deformed, an erection or uprighting of the steering column is caused by this deformation. As a result thereof, the plane of the steering wheel is still further removed from the vertical and the axis of the deformation member still further from the horizontal. The already described unfavorable factors therefore occur to a still considerably further reinforced extent.

The uprighting or erecting of the steering column can be avoided if the steering spindle is subdivided by means of an unguided deformation element or by joints whereas additionally the portion of the steering spindle receiving the steering wheel is constructed relatively short. It can then be achieved that also the deformations caused during serious injuries within the area of the front axle are not transmitted to the portion of the steering arrangement disposed in the vehicle passenger space.

The present invention is therefore concerned with the task to provide a steering arrangement of the aforementioned type which possesses an increased safety function both in case of relatively light as also serious accidents. The present invention essentially consists in that the axis of the deformation member between steering wheel and steering spindle has a flatter or less steep inclination in the normal position than the adjoining part of the steering spindle. As a result thereof, the relatively deformation-soft axis of the deformation member can be aligned to the expected impact or impingement direction of the driver so that at least its function is fully utlilzed.

In one advantageous embodiment of the present invention, provision is made that the axis of the non-guided deformation member is disposed horizontal in the normal zero position, i.e., when the steering wheel is in the straight driving position. This construction then also entails further advantages if during a serious accident the steering column should upright itself because the deformation member cannot be deflected away from the horizontal as far as in the prior art constructions.

Accordingly, it is an object of the present invention to provide a steering arrangement for motor vehicles, especially for passenger motor vehicles which avoids by simple means the aforementioned shortcomings and drawbacks encountered in the prior art.

Another object of the present invention resides in a steering arrangement for motor vehicles which considerably increases the safety protection for the driver.

A further object of the present invention resides in a steering arrangement for motor vehicles, especially for passenger motor vehicles which assures maximum protection by the safety features of the steering arrangement regardless of whether the vehicle is involved in a light or grave accident.

Still another object of the present invention resides in a steering arrangement for passenger motor vehicles in which the plane of the steering wheel rim can be adapted to the expected impact direction of the driver in case of an accident.

Another object of the present invention resides in a steering arrangement which eliminates the danger that only a relatively sharp edge or rim portion faces the driver during an impact against the steering wheel caused by a serious accident.

A still further object of the present invention resides in a safety steering arrangement for passenger motor vehicles which minimizes the danger of serious injuries to the chest of the driver, even if deformations also occur within the area of the front axle.

These and other objects, features and advantages of the present invention will become more apparent from the following description when taken in connection with the accompanying drawing which shows, for purposes of illustration only, several embodiments in accordance with the present invention, and wherein.

Figure 2:
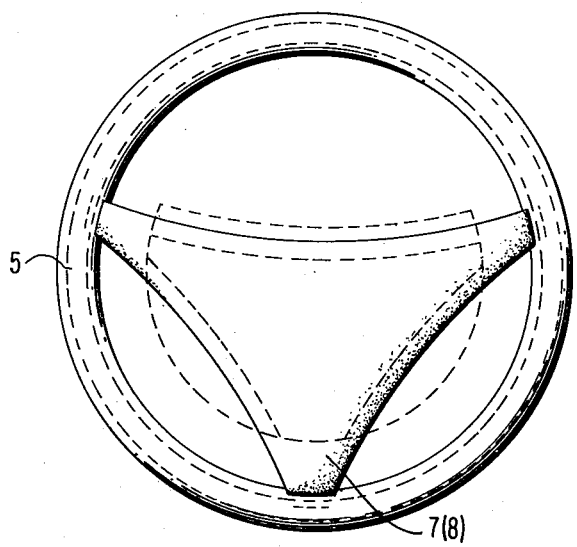
FIG. 2 is an end elavational view of the steering arrangement in accordance with the present invention, illustrated in FIG. 1 as viewed in the driving direction.
Figure 3A:
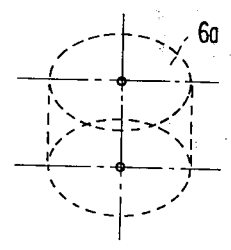
Figure 3C:
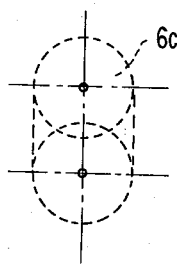
Figure 3B:
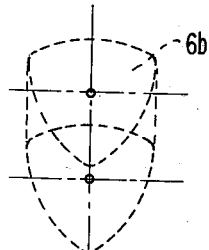
Figure 4:
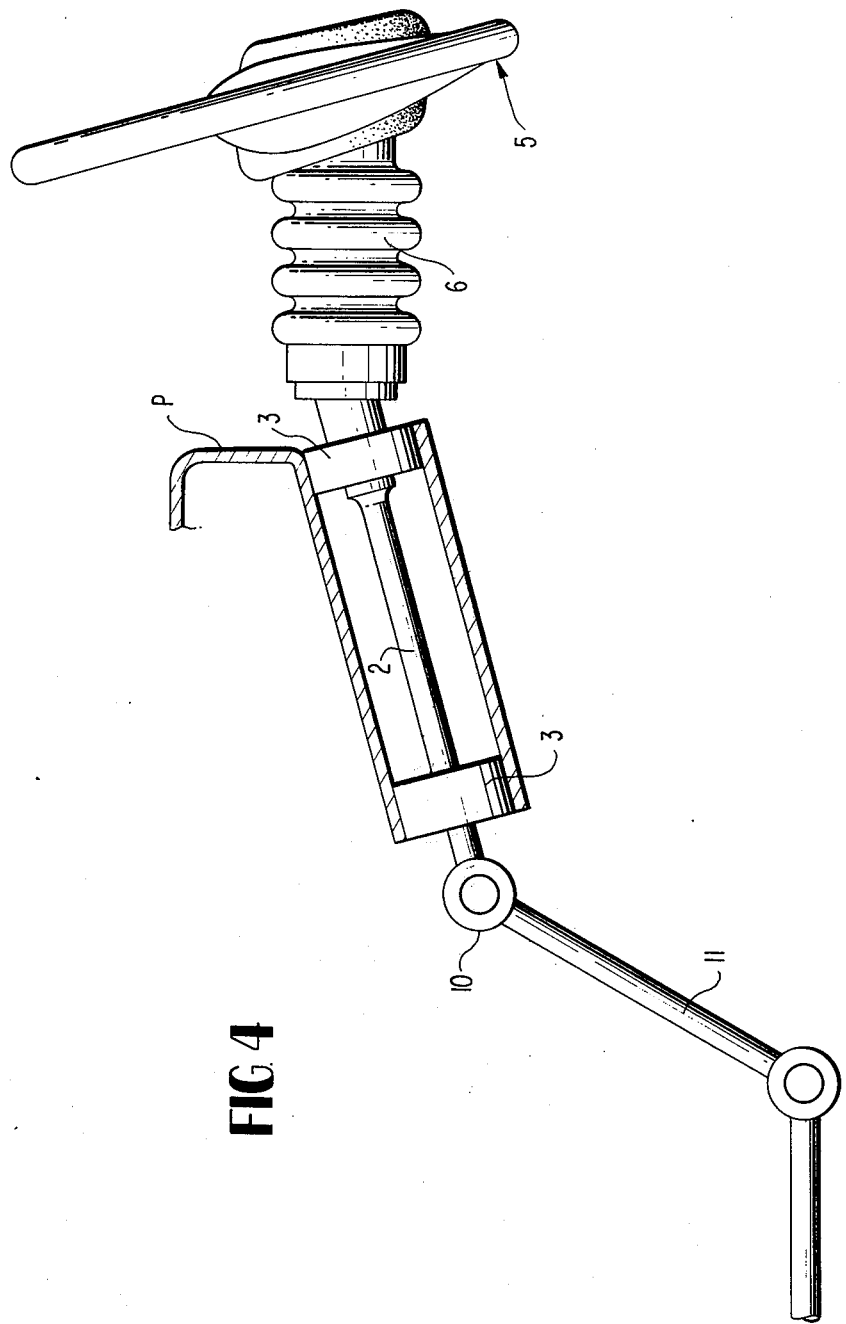

FIGS. 3A, 3B, and 3C are schematic views, similar to FIG. 2 of further embodiments of deformation members according to the present invention and FIG. 4 is a cross-sectional view through a further embodiment of a steering arrangement in accordance with the present invention.

Figure 1:
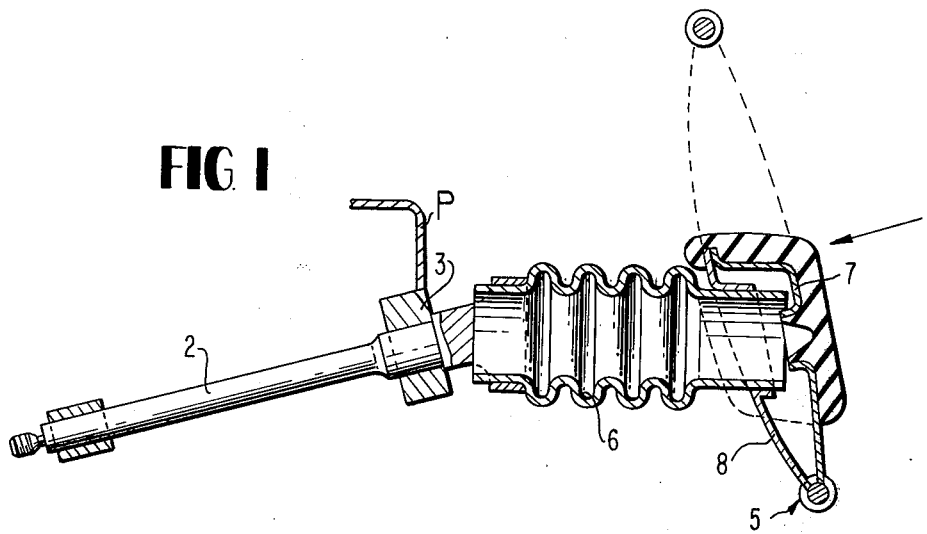
FIG. 1 is a cross-sectional view through a steering arrangement according to the present invention.

Referring now to the drawing wherein like reference numerals are used throughout the various views to designate like parts, and more particularly to FIGS. 1 and 2, the portion of a subdivided steering spindle 2 directed toward the vehicle passenger space is guided in a relatively short outer column (not shown) by means of a bearing support 3 which is secured within the area of the instrument panel P of the vehicle. A steering wheel generally designated by reference numeral 5 adjoins this portion of the steering spindle 2 by way of a deformation member 6 which is constructed, for example, as impact pot. The axis of this deformation member 6 extends horizontally in the illustrated zero position of the steering system, i.e., in the position for straight drive, whereas the axis of the steering spindle 2 has an inclination of about 15° with respect to the horizontal. The plane of the steering wheel rim extends perpendicularly to the axis of the steering spindle 2. The deformation member 6 may be provided with a casing coaxial to the axis of the steering spindle 2 so that the hitherto customary impression remains preserved. As shown in FIG. 2, the area of the deformation member 6 which in the illustrated zero position lies at the top is flattened off.

It is achieved in the illustrated steering arrangement that the axis of the deformation member 6 corresponds far-reachingly to the probable impact direction of the driver so that an effective lay-out and design is possible. It is thereby appropriate if the deformation member 6 is covered off by large-surfaced structural part which, for example, may consist of two sheet metal shells 7 and 8 so that a large as well as an inherently stable and preferably padded abutment surface is created. It is thereby important that the deformation member 6 is non-guided in the radial direction so that slight deviations of the impact direction from the axis of the impact pot cannot yet lead to an impairment of its function.

As shown in FIG. 4, the steering spindle 2 is supported within the area of the instrument panel P and is subdivided into an upper spindle portion 2 connected to a lower spindle portion 11 by way of a conventional joint 10. A further joint is provided on the lower spindle portion 11 for connection with a steering gear (not shown). However, the upper steering spindle portion may also directly adjoin a steering gear which is arranged at the lower end of the short steering shaft portion.

The deformation member 6a which in FIG. 3A has an eliptical cross section is so arranged that in the zero position of the steering wheel the area of the deformation member 6a which lies at the top is flattened off since the smaller radius (minor axis) is directed upwardly and downwardly so that the visibility area above the steering column end is still further increased. The same effect can also be achieved by a deformation member 6b of FIG. 3B having a substantially triangular cross section the size of which are outwardly bowed. However, it should be noted that the horizontal arrangement entails a visibility improvement independently of the cross section which, according to FIG. 3C may also be circularly shaped or the like. The illustrated deformation member 6, 6a, 6b, or 6c possesses an undulated surface. However, it may also have a surface which is smooth or flat, stepped or provided with apertures. Furthermore, it may also have a conical configuration.

As apparent from FIG. 1, upon the occurrence of a collision or the like, the driver of the vehicle would be flung forward onto the steering wheel 5 resulting in a compressing of the deformation member 6 in the zone of its corrugations and a shifting of the steering wheel 5 forwardly in the horizontal direction thereby minimizing if not avoiding serious injuries to the driver of the vehicle.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A steering arrangement for motor vehicles with a steering spindle means which is connected to a steering wheel by way of deformation means, the steering wheel including steering wheel rim means, characterized in that the steering wheel rim means is disposed in a plane perpendicular to the axis of the steering spindle, and in that the axis of the deformation means along the entire length thereof between the steering wheel and the steering spindle means extends horizontally in a normal zero position of the steering wheel, and in that the deformation means is non-guided in the horizontal direction in the zero position.

2. A steering arrangement according to claim 1, characterized in that the steering spindle means is subdivided and is supported within the area of an instrument panel.

3. A steering arrangement according to claim 2, characterized in that the steering spindle means is subdivided by joints.

4. A steering arrangement according to claim 3, characterized in that the area of the deformation means which in the zero position lies at the top, is flattened off.

5. A steering arrangement according to claim 1, characterized in that the area of the deformation means which in the zero position lies at the top, is flattened off.

6. A steering arrangment according to claim 5, characterized in that the steering spindle means is subdivided and is supported within the area of an instrument panel.

7. A steering arrangement according to claim 6, characterized in that the steering spindle means is subdivided by a non-guided deformation element constituted by said deformation means.

8. A steering arrangement according to claim 5, characterized in that the axis of the steering spindle has an inclination of about 15° with respect to the horizontally extending axis of the deformation means.

9. A steering arrangement according to claim 8, characterized in that the steering spindle means is subdivided by joints and is supported within the area of the instrument panel.

10. A steering arrangement according to claim 8, characterized in that the deformation means is a non-guided deformation member having an eliptical cross section with the minor axis thereof extending substantially vertically in the zero position.

11. A steering arrangement according to claim 8, characterized in that the deformation means is a non-guided deformation member having a substantially circular cross-section.

12. A steering arrangement according to claim 9, characterized in that the deformation means is a non-guided deformation member having a substantially triangular cross-section the sides of which are outwardly bowed.

* * * * *